United States Patent

Mizushima et al.

(10) Patent No.: US 12,254,096 B2
(45) Date of Patent: Mar. 18, 2025

(54) RISK ANALYSIS RESULT DISPLAY APPARATUS, METHOD, AND COMPUTER READABLE MEDIUM

(71) Applicant: NEC Corporation, Tokyo (JP)

(72) Inventors: Ryo Mizushima, Tokyo (JP); Hirofumi Ueda, Tokyo (JP); Tomohiko Yagyu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 380 days.

(21) Appl. No.: 17/762,417

(22) PCT Filed: Sep. 27, 2019

(86) PCT No.: PCT/JP2019/038314
§ 371 (c)(1),
(2) Date: Mar. 22, 2022

(87) PCT Pub. No.: WO2021/059516
PCT Pub. Date: Apr. 1, 2021

(65) Prior Publication Data
US 2022/0391515 A1    Dec. 8, 2022

(51) Int. Cl.
*G06F 21/57*    (2013.01)
(52) U.S. Cl.
CPC .................................. *G06F 21/577* (2013.01)
(58) Field of Classification Search
None
See application file for complete search history.

(56) References Cited

U.S. PATENT DOCUMENTS

| 10,192,058 | B1* | 1/2019 | Jalil | G06F 21/552 |
| 10,607,015 | B1* | 3/2020 | Hecht | G06F 9/54 |
| 2019/0096217 | A1* | 3/2019 | Pourmohammad | G08B 31/00 |
| 2021/0185376 | A1* | 6/2021 | Waterman | G11B 27/031 |
| 2021/0312351 | A1* | 10/2021 | Pourmohammad | G06F 16/906 |

(Continued)

FOREIGN PATENT DOCUMENTS

| JP | 2010-073168 A | 4/2010 |
| JP | 2015-130153 A | 7/2015 |

(Continued)

OTHER PUBLICATIONS

JP Office Communication for JP Application No. 2021-548288, mailed on Mar. 28, 2023 with English Translation.

(Continued)

*Primary Examiner* — Joseph P Hirl
*Assistant Examiner* — Hassan Saadoun

(57) ABSTRACT

A comparison means compares a first risk analysis result with a second risk analysis result. The first risk analysis result includes a first risk evaluation value. The second risk analysis result includes a second risk evaluation value. Based on the result of the comparison, a display means displays the first risk evaluation value in such a manner that a first risk evaluation value for which there is a second risk evaluation value, in the second risk analysis result, for an attack step of which an attack destination coincides with an asset included in the first risk analysis result and an attack method coincides with an attack method included in the first risk analysis result can be distinguished from a first risk evaluation value for which there is no such second risk evaluation value.

11 Claims, 9 Drawing Sheets

(56) References Cited

U.S. PATENT DOCUMENTS

| | | | |
|---|---|---|---|
| 2022/0222374 A1* | 7/2022 | Antoniou | G06F 21/6254 |
| 2023/0114719 A1* | 4/2023 | Thomas | G06F 21/567 |
| | | | 726/22 |

FOREIGN PATENT DOCUMENTS

| | | | | |
|---|---|---|---|---|
| JP | 2017-224053 A | 12/2017 | | |
| JP | 2018-077597 A | 5/2018 | | |
| WO | WO-2019067627 A1 * | 4/2019 | | G08B 19/00 |
| WO | WO-2022222005 A1 * | 10/2022 | | |

OTHER PUBLICATIONS

International Search Report for PCT Application No. PCT/JP2019/038314, mailed on Dec. 10, 2019.

IPA, "Security Risk Assessment Guide for Industrial Control Systems, Second Edition", Security Center of Information—technology Promotion Agency, Japan, Oct. 2018, URL: <https://www.ipa.go.jp/security/controlsystem/riskanalysis.html>, pp. 1-380.

Tamiya Hiroto et al., "Threat Analysis Method Considering Physical Attacks for Control Systems", Abstracts of 2018 Symposium on Cryptography and Information Security, Jan. 23, 2018, pp. 1-10.

\* cited by examiner

ASSET-BASED RISK ANALYSIS SHEET

| TARGET ASSET | ATTACK CATEGORY | ATTACK METHOD | EVALUATION INDEX ||||
|---|---|---|---|---|---|---|
| | | | THREAT LEVEL | VULNER-ABILITY LEVEL | BUSINESS RISK LEVEL | RISK VALUE |
| PLC1 | DATA TAMPERING | DATA TAMPERING 1 | 1 | 3 | 3 | 4 |
| PLC1 | DoS ATTACK | DoS ATTACK 2 | 1 | 3 | 3 | 4 |
| PLC1 | DATA ACCESS | DATA THEFT 2 | 3 | 3 | 3 | 5 |
| PLC1 | CODE EXECUTION | CODE EXECUTION 1 | 1 | 3 | 3 | 4 |
| PLC1 | DATA TAMPERING | DATA TAMPERING 2 | 3 | 3 | 3 | 5 |
| PLC1 | DoS ATTACK | DoS ATTACK 1 | 1 | 3 | 3 | 4 |
| PLC1 | DATA ACCESS | DATA THEFT 1 | 1 | 3 | 3 | 4 |
| PLC1 | CODE EXECUTION | CODE EXECUTION 3 | 1 | 3 | 3 | 4 |

BUSINESS DAMAGE-BASED RISK ANALYSIS SHEET

| ITEM NUMBER | ATTACK ROUTE/ATTACK STEP | | | ATTACK OUTLINE | EVALUATION INDEX | | | |
|---|---|---|---|---|---|---|---|---|
| | | | | | THREAT LEVEL | VULNERABILITY LEVEL | BUSINESS RISK LEVEL | RISK VALUE |
| 1 | ENTRY POINT | ATK_PC | | AN ATTACKER HAS AN IMPACT ON A TARGET SYSTEM BY MAKING AN ATTACK FROM A PC AND MAKING A DoS ATTACK IN A HOST A. | | | | |
| | ATTACK TARGET | PLC3 | | | | | | |
| | FINAL ATTACK | DoS ATTACK | | | | | | |
| 2 | ATTACK SOURCE | ATK_PC | | ATTACK OUTLINE | 3 | 3 | 3 | 5 |
| | ATTACK DESTINATION | PLC1 | | THERE IS A POSSIBILITY THAT A MALIGNANT FILE COULD BE PLACED IN A CERTAIN PATH ON A HOST, WHICH IS AN ATTACK TARGET, AND A VULNERABILITY THROUGH WHICH DATA CAN BE TAMPERED IS EXPLOITED AS THE PROGRAM OPENS THE FILE SO THAT DATA COULD BE TAMPERED IN A PATH THAT CAN BE ACCESSED WITH THE AUTHORIZATION OF THE PROGRAM. | | | | |
| | ATTACK CATEGORY | DATA TAMPERING | | | | | | |
| | ATTACK METHOD | DATA TAMPERING1 | | | | | | |
| 3 | ATTACK SOURCE | PLC1 | | ATTACK OUTLINE | 1 | 3 | 3 | 4 |
| | ATTACK DESTINATION | PLC1 | | THERE IS A POSSIBILITY THAT, FOR A HOST WHICH IS AN ATTACK TARGET, A MALIGNANT FILE COULD BE PLACED IN A PATH THAT CAN BE ACCESSED WITH THE AUTHORIZATION OF AN ADMINISTRATOR, AND AS A USER MISTAKENLY OPENS THE FILE, THE CODE COULD BE EXECUTED WITH THE AUTHORIZATION. | | | | |
| | ATTACK CATEGORY | CODE EXECUTION | | | | | | |
| | ATTACK METHOD | CODE EXECUTION1 | | | | | | |
| 4 | ATTACK SOURCE | PLC1 | | ATTACK OUTLINE | 1 | 3 | 3 | 4 |
| | ATTACK DESTINATION | PLC1 | | THERE IS A POSSIBILITY THAT A DoS ATTACK COULD BE MADE BY A DoS ATTACK THAT CAN BE LOGGED IN. | | | | |
| | ATTACK CATEGORY | DoS ATTACK | | | | | | |
| | ATTACK METHOD | DoS ATTACK2 | | | | | | |
| 5 | ATTACK SOURCE | ATK_PC | | ATTACK OUTLINE | 1 | 3 | 3 | 4 |
| | ATTACK DESTINATION | PLC1 | | THERE IS A POSSIBILITY THAT A DoS ATTACK COULD BE MADE BY EXPLOITING A VULNERABILITY THROUGH WHICH A DoS ATTACK CAN BE MADE ON A PROGRAM ON A HOST, WHICH IS AN ATTACK TARGET. | | | | |
| | ATTACK CATEGORY | DoS ATTACK | | | | | | |
| | ATTACK METHOD | DoS ATTACK1 | | | | | | |

| ASSET | ATTACK METHOD | OCCURRENCE OF APPEARANCE OF SCENARIO | RISK VALUE (SCENARIO) | RISK VALUE (ASSET) |
|---|---|---|---|---|
| PLC1 | DATA TAMPERING 1 | YES | 5 | 4 |
| | CODE EXECUTION 1 | NO | -- | 4 |
| | DATA TAMPERING 2 | YES | 4 | 5 |
| | ⋮ | ⋮ | ⋮ | ⋮ |
| ⋮ | ⋮ | ⋮ | ⋮ | ⋮ |

Fig. 5

| ATTACK CATEGORY | ATTACK METHOD | WINServer | WIN7PRO | Firewall | SCADA | EWS | HISTORIAN | PLC1 | PLC2 |
|---|---|---|---|---|---|---|---|---|---|
| DATA ACCESS | DATA THEFT 1 | 3 | 1 | 1 | 4 | 3 | 1 | 4 | 4 |
| DATA ACCESS | DATA THEFT 2 | 3 | 1 | 1 | 5 | 4 | 1 | 5 | 5 |
| DATA TAMPERING | DATA TAMPERING 1 | 3 | 1 | 1 | 4 | 3 | 1 | 5 | 4 |
| DATA TAMPERING | DATA TAMPERING 2 | 4 | 1 | 1 | 5 | 4 | 3 | 4 | 5 |
| DoS ATTACK | DoS ATTACK 1 | 3 | 1 | 1 | 4 | 3 | 1 | 4 | 4 |
| DoS ATTACK | DoS ATTACK 2 | 4 | 3 | | 5 | 4 | 3 | 4 | 4 |
| CODE EXECUTION | CODE EXECUTION 1 | 4 | 3 | | 5 | 4 | 3 | 4 | 4 |
| CODE EXECUTION | CODE EXECUTION 2 | 3 | 1 | 1 | 4 | 3 | 1 | 4 | 4 |
| CODE EXECUTION | CODE EXECUTION 3 | 3 | 1 | | 4 | 3 | 1 | 4 | 4 |
| CODE EXECUTION | CODE EXECUTION 4 | 4 | 3 | | 5 | 4 | 3 | 4 | 4 |

Fig. 6

| ATTACK CATEGORY | ATTACK METHOD | ASSET BASIS | SCENARIO BASIS |
|---|---|---|---|
| DATA ACCESS | DATA THEFT 1 | 4 | — |
| DATA ACCESS | DATA THEFT 2 | 5 | — |
| DATA TAMPERING | DATA TAMPERING 1 | 5 | 5 |
| DATA TAMPERING | DATA TAMPERING 2 | 4 | 4 |
| DoS ATTACK | DoS ATTACK 1 | 4 | 4 |
| DoS ATTACK | DoS ATTACK 2 | 4 | 4 |
| CODE EXECUTION | CODE EXECUTION 1 | 4 | — |
| CODE EXECUTION | CODE EXECUTION 2 | — | — |
| CODE EXECUTION | CODE EXECUTION 3 | 4 | 4 |
| CODE EXECUTION | CODE EXECUTION 4 | — | — |

Fig. 8

RISK ANALYSIS RESULT DISPLAY APPARATUS, METHOD, AND COMPUTER READABLE MEDIUM

This application is a National Stage Entry of PCT/JP2019/038314 filed on Sep. 27, 2019, the contents of all of which are incorporated herein by reference, in their entirety.

TECHNICAL FIELD

The present disclosure relates to a risk analysis result display apparatus, a method, and a computer readable medium.

BACKGROUND ART

In recent years, threats of cyber-attacks have not been limited to the fields of ICT (Information and Communication Technology), and have also spread in the fields of control systems and IoT (Internet of Things) and are causing damages therein. In the case of control systems, in particular, there have been cases where the operation of a critical infrastructure has been jeopardized, such as a case where a power system or a factory is shut down. To cope with such threats of cyber-attacks, it is important to clarify security risks present in a system, implement countermeasures thereagainst, and thereby reduce the risks.

In regard to the above-described matters, Security Center of Information-technology Promotion Agency, Japan, has published a security risk analysis guide for control systems (Non-patent Literature 1). In Non-patent Literature 1, two different methods for analyzing a risk in a detailed manner, i.e., a method for analyzing a risk from the viewpoint of a precise evaluation for each system asset and a method for analyzing a risk from the viewpoint of an evaluation of an actual attack scenario from an attacker's point of view, are explained. One of the above methods is an asset-based risk analysis, and the other is a business impact-based risk analysis.

In the case of the asset-based risk analysis, a risk is evaluated, for each of assets constituting a system to be protected, by using its importance (its value), a possibility of the occurrence of a conceivable threat, and a vulnerability to the threat as three evaluation indices. The business impact-based risk analysis is an analysis in which an attack scenario and an attack tree are used. In the case of the business impact-based risk analysis, a risk is evaluated, for a business or a service implemented by a system, by using a business damage and its level, a possibility of the occurrence of an attack tree that causes business damage, and a vulnerability to the attack as three evaluation indices. Either just the asset-based risk analysis by itself or the business impact-based risk analysis by itself can provide an effective evaluation result. However, they also function in a manner complementary to each other, so in some cases, these two different analyses are performed for one control system.

Note that Patent Literature 1 discloses a technique for supporting planning of security measures when designing security for a large-scale system. In a security measure planning support apparatus disclosed in Patent Literature 1, system configuration information, network configuration information, risk analysis results, etc. are input. The risk analysis results are data in which a result of an analysis of a risk in each threat item is recorded. The risk analysis results include threat items, attack paths, attackers, threat events, attack methods, and risk values. The risk value indicates the degree of damage that an attack in the threat item inflicts on the system.

The security measure planning support apparatus extracts, for a threat item whose risk value exceeds a threshold value, components included in an attack path from the system configuration information and the network configuration information. The security measure planning apparatus records, for each threat item, information about the extracted components included in the attack path in the form of an attack path table. The security measure planning apparatus makes a list of possible security measures by referring to the attack path table, the risk analysis results, and a threat-to-countermeasure database, and records the list as a countermeasure list.

CITATION LIST

Patent Literature

Patent Literature 1: Japanese Unexamined Patent Application Publication No. 2018-77597

Non Patent Literature

Non-patent Literature 1: "Security Risk Assessment Guide for Industrial Control Systems, Second Edition", Security Center of Information-technology Promotion Agency, Japan, https://www.ipa.go.jp/security/controlsystem/riskanalysis.html, October 2018

SUMMARY OF INVENTION

Technical Problem

A person (a user) who plans security measures determines, for example, for which level of a risk he/she should take security measures under the constraints of the cost and the like by using results of risk analyses. However, when two different risk analyses are performed, they are performed independently of each other and the analysis results of these risk analyses are also independently of each other. Therefore, the user needs to compare the results of the two different analyses in a detailed manner and determine for which risk(s) he/he should take security measures.

The analysis results used in Patent Literature 1 include an attack path, an attacker, a threat event, and an attack method, and correspond to the results of business impact-based risk analyses in Non-patent Literature 1. Patent Literature 1 uses only the business impact-based risk analysis results, and does not use the asset-based risk analysis results. Therefore, Patent Literature 1 does not provide any means for solving the above-described problem.

In view of the above-described circumstances, an object of the present disclosure is to provide a risk analysis result display apparatus, a method, and a computer readable medium capable of assisting a user to plan security measures by using results of two different risk analyses.

Solution to Problem

To achieve the above-described object, the present disclosure provides a risk analysis result display apparatus including: comparison means for comparing a first risk analysis result including a first risk evaluation value with a second risk analysis result including a second risk evaluation value, the first risk evaluation value being a value that is obtained by evaluating a risk that arises when an attack is made on an asset in a system to be analyzed by at least one conceivable attack method, and the second risk evaluation value being a value that is obtained by evaluating a risk that arises, when an attack is made on the system along an attack path including at least one attack step including an attack source, an attack destination, and an attack method, by the attack step, the attack path being a path from an entry point included in the system to an attack target; and display means for displaying the first risk evaluation value based on a result of the comparison, the display means being configured to display first risk evaluation values in such a manner that a first risk evaluation value for a pair of an asset and an attack method for which there is a second risk evaluation value, in the second risk analysis result, for an attack step of which the attack destination coincides with the asset included in the first risk analysis result and the attack method coincides with the attack method included in the first risk analysis result can be distinguished from a first risk evaluation value for a pair of an asset and an attack method for which there is no second risk evaluation value, in the second risk analysis result, for the attack step of which the attack destination coincides with the asset included in the first risk analysis result and the attack method coincides with the attack method included in the first risk analysis result.

Further, the present disclosure provides a risk analysis result display method including: comparing a first risk analysis result including a first risk evaluation value with a second risk analysis result including a second risk evaluation value, the first risk evaluation value being a value that is obtained by evaluating a risk that arises when an attack is made on an asset in a system to be analyzed by at least one conceivable attack method, and the second risk evaluation value being a value that is obtained by evaluating a risk that arises, when an attack is made on the system along an attack path including at least one attack step including an attack source, an attack destination, and an attack method, by the attack step, the attack path being a path from an entry point included in the system to an attack target; and displaying first risk evaluation values based on a result of the comparison in such a manner that, a first risk evaluation value for a pair of an asset and an attack method for which there is a second risk evaluation value, in the second risk analysis result, for an attack step of which the attack destination coincides with the asset included in the first risk analysis result and the attack method coincides with the attack method included in the first risk analysis result can be distinguished from a first risk evaluation value for a pair of an asset and an attack method for which there is no second risk evaluation value, in the second risk analysis result, for the attack step of which the attack destination coincides with the asset included in the first risk analysis result and the attack method coincides with the attack method included in the first risk analysis result.

Further, the present disclosure provides a non-transitory computer readable medium storing a program for causing a computer to perform processes including: comparing a first risk analysis result including a first risk evaluation value with a second risk analysis result including a second risk evaluation value, the first risk evaluation value being a value that is obtained by evaluating a risk that arises when an attack is made on an asset in a system to be analyzed by at least one conceivable attack method, and the second risk evaluation value being a value that is obtained by evaluating a risk that arises, when an attack is made on the system along an attack path including at least one attack step including an attack source, an attack destination, and an attack method, by the attack step, the attack path being a path from an entry point included in the system to an attack target; and displaying first risk evaluation values based on a result of the comparison in such a manner that a first risk evaluation value for a pair of an asset and an attack method for which there is a second risk evaluation value, in the second risk analysis result, for an attack step of which the attack destination coincides with the asset included in the first risk analysis result and the attack method coincides with the attack method included in the first risk analysis result can be distinguished from a first risk evaluation value for a pair of an asset and an attack method for which there is no second risk evaluation value, in the second risk analysis result, for the attack step of which the attack destination coincides with the asset included in the first risk analysis result and the attack method coincides with the attack method included in the first risk analysis result.

Advantageous Effects of Invention

The risk analysis result display apparatus, the method, and the computer readable medium according to the present disclosure can assist a user to plan security measures by using results of two different risk analyses.

BRIEF DESCRIPTION OF DRAWINGS

FIG. 3 shows a specific example of results of asset-based risk analyses;

FIG. 4 shows a specific example of results of business impact-based risk analyses;

FIG. 5 shows a specific example of data stored in a comparison result DB;

FIG. 6 shows an example showing how to display risk evaluation values;

FIG. 8 shows another example showing how to display risk evaluation values; and

DESCRIPTION OF EMBODIMENTS

Figure 1:
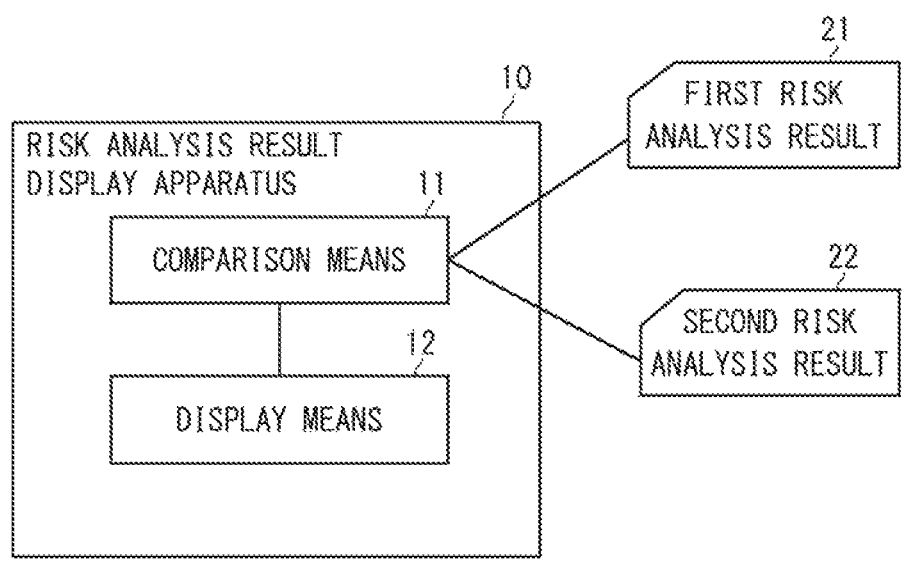
FIG. 1 is a block diagram schematically showing a security risk analysis support apparatus according to the present disclosure.

Prior to giving a description of an example embodiment according to the present disclosure, an outline of the present disclosure will be described. FIG. 1 schematically shows a security risk analysis support apparatus according to the present disclosure. The risk analysis result display apparatus 10 includes comparison means 11 and display means 12.

The comparison means 11 compares a first risk analysis result 21 with a second risk analysis result 22. The first risk analysis result 21 includes a first risk evaluation value that is obtained by evaluating a risk that arises when an attack is made on an asset in a system to be analyzed by at least one conceivable attack method. The second risk analysis result 22 indicates a result of an evaluation of a risk that arises when an attack is made along an attack path from an entry point included in the system to an attack target. The attack path includes at least one attack step including an attack source (i.e., an entity or the like which makes an attack), an attack destination (i.e., an entity or the like on which the attack is made), and an attack method. The second risk analysis result 22 includes a second risk evaluation value that is obtained by evaluating a risk that arises, when an attack is made along the attack path, by the attack step.

The display means 12 displays the first risk evaluation value included in the first risk analysis result 21 based on the result of the comparison by the comparison means 11. The display means 12 determines whether or not, in the second risk analysis result 22, there is a second risk evaluation value for an attack step of which the attack destination coincides with an asset included in the first risk analysis result 21 and the attack method coincides with the attack method included in the first risk analysis result 21. The display means 12 displays first risk evaluation values in such a manner that a first risk evaluation value for a pair of an asset and an attack method for which there is such a second risk evaluation value can be distinguished from a first risk evaluation value for a pair of an asset and an attack method for which there is not such a second risk evaluation value.

The first and second risk analysis results 21 and 22 can include, for an attack on the same asset using the same attack method, risk evaluation values evaluated from viewpoints different from each other. Further, the first risk analysis result 21 can include a first risk evaluation value for an attack method that is not included in the risk evaluation in the second risk analysis result 22. In the present disclosure, the comparison means 11 compares the first risk analysis result 21 with the second risk analysis result 22. The display means 12 displays first risk evaluation values in such a manner that a first risk evaluation value that is included in the second risk analysis result 22 for the same asset and the same attack method can be distinguished from a first risk evaluation value that is not included in the second risk analysis result 22. By doing so, a user can determine whether the first risk evaluation value is a risk evaluation value for a risk that is also evaluated in the second risk analysis result 22 or a risk evaluation value for a risk that is not evaluated in the second risk analysis result 22. Therefore, the present disclosure can assist a user to plan security measures by using results of two different risk analyses.

Figure 2:
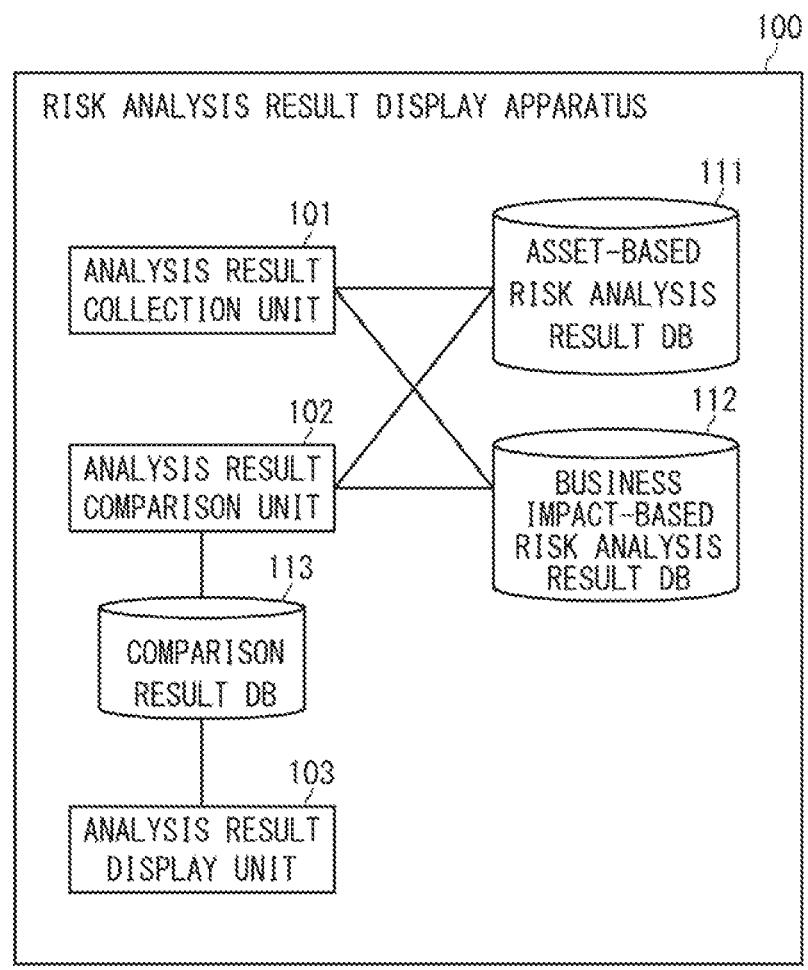
FIG. 2 is a block diagram showing a risk analysis result display apparatus according to an example embodiment of the present disclosure.

An example embodiment according to the present disclosure will be described hereinafter in detail with reference to the drawings. FIG. 2 shows a risk analysis result display apparatus according to an example embodiment of the present disclosure. The risk analysis result display apparatus 100 includes an analysis result collection unit 101, an analysis result comparison unit 102, an analysis result display unit 103, an asset-based risk analysis result database (DB) 111, a business impact-based risk analysis result DB 112, and a comparison result DB 113.

Note that each of the asset-based risk analysis result DB 111, the business impact-based risk analysis result DB 112, and the comparison result DB 113 does not need to be a part of the risk analysis result display apparatus 100, as long as it can be accessed by the risk analysis result display apparatus 100. For example, at least a part of these databases may be located in a cloud, and the risk analysis result display apparatus 100 may access the database located in the cloud through a network.

The analysis result collection unit 101 collects results of two different risk analyses for the same system to be analyzed. Specifically, the analysis result collection unit 101 collects results of asset-based risk analyses for the system to be analyzed (asset-based risk analysis results) and results of business impact-based (scenario-based) risk analyses for the same system (business impact-based risk analysis results).

The analysis result collection unit 101 stores the asset-based risk analysis results in the asset-based risk analysis result DB 111 and stores the business impact-based risk analysis results in the business impact-based risk analysis result DB 112. Note that the asset-based risk analyses and the business impact-based risk analyses do not need to be exactly the same as the asset-based risk analyses and the business impact-based risk analyses, respectively, disclosed in Non-patent Literature 1.

Note that the asset-based risk analysis results indicate results of evaluations of risks for assets constituting the system to be analyzed. The asset-based risk analysis results include risk evaluation values obtained by evaluating risks that arises when an attack is made on an asset by at least one conceivable attack method. Meanwhile, the business impact-based risk analysis results indicate results of evaluations of risks that arise when an attack is made along an attack path from an entry point included in the system to be analyzed to an attack target. The attack path includes at least one attack step including an attack source, an attack destination, and an attack method. The business impact-based risk analysis results include risk evaluation values obtained by evaluating risks that arise, when an attack is made along the attack path, by the attack step. The risk analysis results stored in the asset-based risk analysis result DB 111 and the business impact-based risk analysis results DB correspond to the first and second risk analysis results 21 and 22, respectively, shown in FIG. 1.

FIG. 3 shows a specific example of the asset-based risk analysis results. The asset-based risk analysis results include data in each of items "Target Asset", "Attack Category," "Attack Method," and "Evaluation Index". The "Evaluation Index" includes sub-items "Threat Level," "Vulnerability Level," "Business Risk Level," and "Risk Value". The target asset indicates identification information of an asset for which an evaluation is made. The attack method indicates identification information of an attack to be used. Each of the threat Level, the vulnerability level, and the business risk level is evaluated, for example, in three levels (i.e., classified into three levels). The risk value (the risk evaluation value) is evaluated, for example, in five levels (i.e., classified into five levels) according to the combination of the threat level, the vulnerability level, and the business risk level.

FIG. 3 shows, as an example, risk evaluation values when attacks are made on an asset "PLC1" by a plurality of attack methods. In FIG. 3, for example, the threat level, the vulnerability level, and the business risk level are evaluated as (i.e., rated as) "1", "3" and "3", respectively, for an attack by an attack method "Data Tampering 1", which is data tampering for the asset "PLC1". In this case, the risk value (the risk evaluation value) is evaluated as "4" in the 5-level evaluation. The asset-based risk analysis results include, for each of a plurality of assets constituting the system, for example, a risk evaluation value that arises when an attack is made on the asset by using a conceivable attack method.

FIG. 4 shows a specific example of the business impact-based risk analysis results. FIG. 4 includes attack steps in the case where: the entry point is "ATK_PC"; the attack target is "PLC1"; and the final attack is "DoS attack" (see Item Numbers "2" to "5"). For example, the attack step in the Item Number "2" indicates that: the attack source is "ATK_PC"; the attack destination is "PLC1"; and the attack method is "Data Tampering 1". In this example, the business impact-based risk analysis results include an "evaluation index" for each attack step. The "Evaluation Index" includes "Threat level", "Vulnerability Level", "Business Risk Level", and "Risk Value".

In FIG. 4, all of the threat level, the vulnerability level, and the business risk level are evaluated as "3" for the attack step in the Item Number "2". In this case, the risk value is evaluated as "5". The business impact-based risk analysis results include, for example, a risk evaluation value for each attack step for each of a plurality of attack paths that are conceivable in the system to be analyzed.

The analysis result comparison unit 102 compares the asset-based risk analysis results with the business impact-based risk analysis results. For example, the analysis result comparison unit 102 stores pairs of assets and attack methods, and risk evaluation values (first risk evaluation values) included in the asset-based risk analysis results in the comparison result DB 113 while associating the pairs of assets and attack methods with the risk evaluation values. Further, the analysis result comparison unit 102 stores risk evaluation values (second risk evaluation values) included in the business impact-based risk analysis results in the comparison result DB 113 while associating the risk evaluation values with the assets at the attack destination and the attack methods. The analysis result comparison unit 102 stores, for each of the first risk evaluation values, information indicating whether or not there is a second risk evaluation value for the same pair of the asset and the attack method in the comparison result DB 113. The analysis result comparison unit 102 corresponds to the comparison means 11 in FIG. 1.

FIG. 5 shows a specific example of data (comparison result information) stored in the comparison result DB 113. In the comparison result DB 113, a table in which "assets", "attack methods", "occurrences of appearances of scenarios", "risk values (scenarios)", and "risk values (assets)" are associated with each other is stored. In the column "Asset", the analysis result comparison unit 102 stores identification information of assets for which evaluations are made in the asset-based risk analysis results. Further, in the column "Attack method", the analysis result comparison unit 102 stores identification information of attack methods for which risk values are evaluated in the asset-based risk analysis results. In the column "Risk Value (Asset)", the analysis result comparison unit 102 stores risk values included in the asset-based risk analysis results.

The analysis result comparison unit 102 searches the business impact-based risk analysis results by using an "asset" and an "attack method" as keys, and examines whether or not there is an attack step of which the "attack destination" and the "attack method" coincide with a pair of an asset and an attack method included in the asset-based risk analysis results. When there is an attack step of which the "attack destination" and the "attack method" coincide with a pair of an asset and an attack method included in the asset-based risk analysis results, the analysis result comparison unit 102 stores "Yes", which indicates that there is an appearance, in the column "Occurrence of Appearance of Scenario". Further, the analysis result comparison unit 102 stores the risk value of that attack step included in the business impact-based risk analysis results in the column "Risk Value (Scenario)". When there is no attack step of which the "attack destination" and the "attack method" coincide with a pair of an asset and an attack method included in the asset-based risk analysis results, the analysis result comparison unit 102 stores "No", which indicates that there is no appearance, in the column "Occurrence of Appearance of Scenario".

For example, the asset-based risk analysis results (see FIG. 3) include a risk value "4" for the asset "PLC1" and the attack method "Data Tampering 1". The analysis result comparison unit 102 refers to the business impact-based risk analysis results and thereby examines whether or not there is an attack step of which the attack destination is the asset "PLC1" and the attack method is "Data Tampering 1". Referring to FIG. 4, the attack destination is the asset "PLC1" and the attack method is the attack method "Data Tampering 1" in the attack step in the Item Number "2". In this case, the analysis result comparison unit 102 stores "Yes" in the column "Occurrence of Appearance of Scenario" in the comparison result DB 113 while associating it with the asset "PLC1" and the attack method "Data Tampering 1". Further, the analysis result comparison unit 102 stores the risk value "4" included in the asset-based risk analysis results and the risk value "5" included in the business impact-based risk analysis results in the comparison result DB 113 while associating them with the asset "PLC1" and the attack method "Data Tampering 1".

Further, the asset-based risk analysis results include the risk value "4" for the asset "PLC1" and the attack method "Code Execution 1". The analysis result comparison unit 102 refers to the business impact-based risk analysis results and thereby examines whether or not there is an attack step of which the attack destination is the asset "PLC1" and the attack method is "Code Execution 1". In this example, it is assumed that the business impact-based risk analysis results do not include such an attack step. In this case, the analysis result comparison unit 102 stores "No" in the column "Occurrence of Appearance of Scenario" in the comparison result DB 113 while associating it with the asset "PLC1" and the attack method "Code Execution 1". Further, the analysis result comparison unit 102 stores the risk value "4" included in the asset-based risk analysis results in the comparison result DB 113 while associating it with the asset "PLC1" and the attack method "Code Execution 1".

Note that an attack path used in the business impact-based risk analyses may include a plurality of attacks on the same attack destination using the same attack method. In such a case, the business impact-based risk analysis results include a plurality of risk evaluation values for the attacks on the same attack destination using the same attack method. When the business impact-based risk analysis results include a plurality of risk evaluation values for the same pair of an asset and an attack method, the analysis result comparison unit 102 may store a representative value of the plurality of risk evaluation values in the comparison result DB 113. For example, the analysis result comparison unit 102 may store the maximum value among the plurality of risk evaluation values (a value indicating the highest risk) in the comparison result DB 113.

Further, the business impact-based risk analysis results may have no risk evaluation value for an individual attack step. For example, in business impact-based risk analyses in Non-patent Literature 1, a risk is evaluated for each attack path, and business impact-based risk analysis results include a risk evaluation value for each attack path. Specifically, for example, in the example shown in FIG. 4, the "evaluation indices" for the attack steps in the Item Numbers "2" and "3" are blank, while an "evaluation index" is recorded for the attack step in the Item Number "4", which is the end of the attack path. In such a case, the analysis result comparison unit 102 may store a risk evaluation value for an attack path in which an attack step is included in the column "Risk Value (Scenario)" in the comparison result DB 113. For example, the analysis result comparison unit 102 may store the risk evaluation value for the attack step in the Item Number "4" for combinations of assets and attack methods corresponding to the attack steps in the Item Numbers "2" and "3". Alternatively, the analysis result comparison unit 102 may leave the "risk values (scenarios)" for the attack steps included in the comparison result DB 113 for which there are no risk evaluation values blank.

The analysis result display unit 103 displays the risk evaluation values (the first risk evaluation values) included in the asset-based risk analysis results on a display apparatus or the like (not shown). The analysis result display unit 103 displays the first risk evaluation values in such a manner that it is possible to determine whether or not a risk evaluation value (a second risk evaluation value) for the same asset and attack method as those of a first risk evaluation value is included in the business impact-based risk analysis results. The analysis result display unit 103 corresponds to the display means 12 in FIG. 1.

The analysis result display unit 103 determines whether or not there is a risk evaluation value for an attack step of which the attack destination coincides with an asset included in the asset-based risk analysis results and the attack method coincides with an attack method included in the asset-based risk analysis results in the business impact-based risk analysis results. In other words, the analysis result display unit 103 determines whether or not a risk evaluation value for the same pair of an asset and an attack method evaluated in the asset-based risk analysis results is included in the business impact-based risk analysis results. For example, the analysis result display unit 103 refers to the column "Occurrence of Appearance of Scenario" in the comparison result DB 113 and thereby determines whether or not a risk evaluation value for the same pair of an asset and an attack method evaluated in the asset-based risk analysis results is included in the business impact-based risk analysis results.

The analysis result display unit 103 displays first risk evaluation values in different display manners (i.e., different formats) depending on whether or not the risk evaluation value for the same pair of an asset and an attack method evaluated in the asset-based risk analysis results is included in the business impact-based risk analysis results. For example, the analysis result display unit 103 displays a first risk evaluation value (a risk value (an asset)) for a pair of an asset and an attack method for which the "occurrence of appearance of scenario" is "Yes" and a first risk evaluation value for a pair of an asset and an attack method for which the "occurrence of appearance of scenario" is "No" in manners (e.g., formats) different from each other. The analysis result display unit 103 displays a list of first risk evaluation values included in the asset-based risk analysis results for combinations of a plurality of assets and a plurality of attack methods.

FIG. 6 shows an example showing how to display risk evaluation values. Specifically, FIG. 6 shows an example showing how to display risk evaluation values included in asset-based risk analysis results for ten attack methods and eight assets. For example, the analysis result display unit 103 changes the display color or display gray-scale of at least one of the risk evaluation value included in the asset-based risk analysis results or the field (the background) in which the risk evaluation value is displayed depending on whether or not there is a risk evaluation value for the corresponding combination included in the business impact-based risk analysis results. In the example shown in FIG. 6, it is shown that combinations displayed in dark gray are those for which there are no risk evaluation values in the business impact-based risk analysis results. Further, it is shown that combinations of which numerical values are blank are those for which risks are not valuated in the asset-based risk analysis results.

Further, the analysis result display unit 103 may also change, for combinations included in both the asset-based risk analysis results and the business impact-based risk analysis results, the display color or display gray-scale of at least one of the risk evaluation value or the field in which the risk evaluation value is displayed according to the risk evaluation value. For example, in the example shown in FIG. 6, the higher the risk evaluation value is, the brighter the display gray-scale is made. In this case, a user can find more easily combinations of assets and attack methods for which risk evaluation values, i.e., risks, are high. When the analysis result display unit 103 displays risk evaluation values in color, it may display them by using a color map in which the higher the risk evaluation value is, the stronger the red component becomes, and the lower the risk evaluation value is, the stronger the blue component becomes.

In FIG. 6, when attention is paid to the asset "PLC1", the risk evaluation values for the attack methods "Data Theft 2" and "Data Tampering 1" are both "5". In FIG. 6, the column for the attack method "Data Tampering 1" is displayed in white. This means that a user can recognize that there is a risk evaluation value for an attack step of which the attack destination is "PLC1" and the attack method is "Data Tampering 1" in the business impact-based risk analysis results. In other words, the user can recognize that when an attack is made according to the attack scenario, an attack on the asset PLC1 using the attack method "Data Tampering 1" is presumed. It is considered that it is desirable to preferentially take security measures for such a combination of an asset and an attack method.

Meanwhile, in FIG. 6, the column for the attack method "Data Theft 2" is displayed in dark gray. This means that a user can recognize that there is no risk evaluation value for an attack step of which the attack destination is "PLC1" and the attack method is "Data Theft 2" in the business impact-based risk analysis results. In other words, the user can recognize that when an attack is made according to the attack scenario, an attack on the asset PLC1 using the attack method "Data Theft 2" is not presumed. It is considered that it is unnecessary to preferentially take security measures for such a combination of an asset and an attack method. However, even a combination that is not used in an attack along an attack path could still pose a potential threat. Therefore, it is considered that, although the priority is low, security measures should be taken if there are enough costs, time, and the like.

A user can refer to the risk evaluation values shown in FIG. 6 when he/she plans security measures. For example, the user can preferentially take security measures for an attack method(s) that poses a high risk and is presumed to be used when an attack is made according to an attack scenario. By doing so, the user can preferentially take security measures against a risk(s) that could be posed by an attack along a conceivable attack path. Further, the user does not take security measures for an attack method(s) that poses a high risk but is not presumed to be used when an attack is made according to an attack scenario. In such a case, the user can prevent security measures from being unnecessarily taken for a risk(s) that cannot be posed by an attack along a conceivable attack path.

Figure 7:
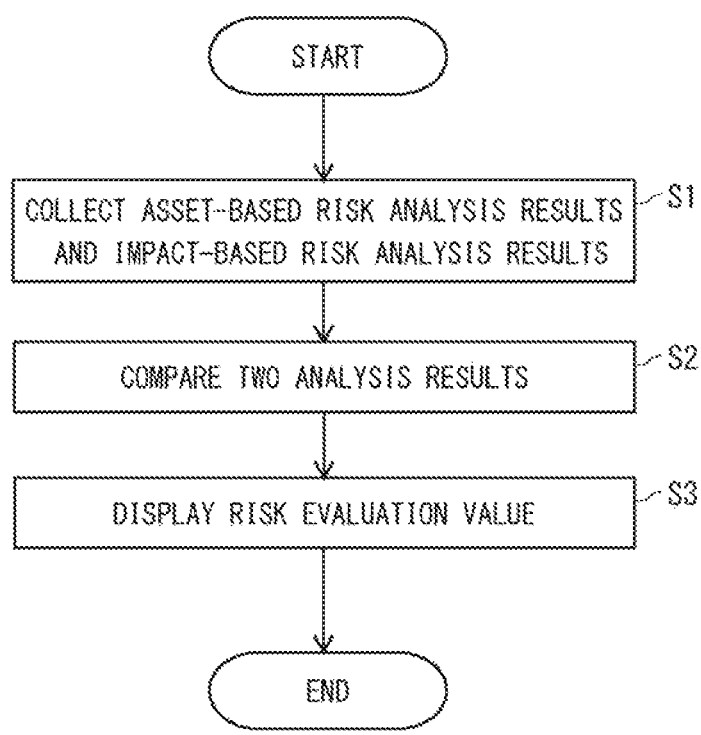
FIG. 7 is a flowchart showing an operational procedure performed by a risk analysis result display apparatus.

Next, an operational procedure (a method for displaying risk analysis results) performed by the risk analysis result display apparatus 100 will be described. FIG. 7 shows the operational procedure performed by the risk analysis result display apparatus 100. The analysis result collection unit 101 collects asset-based risk analysis results and business impact-based risk analysis results (Step S1). The analysis result comparison unit 102 compares the asset-based risk analysis results with the business impact-based risk analysis results (Step S2). In the step S2, for example, the analysis result comparison unit 102 examines, for combinations of assets and attack methods, whether or not there is a risk evaluation value that is obtained by evaluating a risk for the same combination in both the asset-based risk analysis results and the business impact-based risk analysis results.

The analysis result display unit 103 displays risk evaluation values included in the asset-based risk analysis results (Step S3). The analysis result display unit 103 displays the risk evaluation values included in the asset-based risk analysis results in such a manner that risk evaluation values for which there are risk evaluation values for the same combinations in the business impact-based risk analysis results can be distinguished from risk evaluation values for which there are no risk evaluation values for the same combination in the business impact-based risk analysis results. A user can plan security measures by referring to the risk evaluation values displayed in the step S3.

In general, asset-based risk analysis results could include risk evaluation values for attack methods that cannot be used in attacks along attack paths conceivable in business impact-based risk analyses. In this example embodiment, the analysis result display unit 103 displays the risk evaluation values included in the asset-based risk analysis results in such a manner that it is possible to determine whether or not risks for assets and attack methods evaluated therein are also evaluated in the business impact-based risk analysis results. In this way, a user can determine for which risk(s) he/she should preferentially take security measures. Therefore, this example embodiment can assist a user to plan security measures by using results of two different risk analyses.

Note that although an example in which the analysis result display unit 103 displays a list of risk evaluation values for a plurality of attack methods and a plurality of assets is described in the above-described example embodiment, the present disclosure is not limited to such examples. For example, the analysis result display unit 103 may display, in a risk analysis sheet showing the asset-based risk analysis results, combinations of assets and attack methods that are not included in the business impact-based risk analysis results, for example, in gray. Further, for example, the analysis result display unit 103 may display the risk evaluation values included in the asset-based risk analysis results in such a manner that they can be compared with the risk evaluation values included in the business impact-based risk analysis results. Even in this case, by comparing the risk evaluation values included in the asset-based risk analysis results with those included in the business impact-based risk analysis results, it is possible to determine whether or not risks for the same assets and attack methods evaluated in the asset-based risk analysis results are also evaluated in the business impact-based risk analysis results.

FIG. 8 shows another example showing how to display risk evaluation values. In this example, it is assumed that the analysis result display unit 103 displays risk evaluation values for the asset "PLC1". For the asset "PLC1", the analysis result display unit 103 displays, for each attack method, a risk evaluation value included in the asset-based risk analysis results and that included in the business impact-based risk analysis results side by side. The symbol "-" indicates that there is no risk evaluation value for the corresponding attack method in the asset-based risk analysis results or in the business level analysis results. The analysis result display unit 103 may, for example, display the risk analysis results for the individual assets shown in FIG. 8 when the asset "PLC1" is selected in the displayed list shown in FIG. 6.

By referring to the display (i.e., the table) shown in FIG. 8, a user can find that, for example, the risk evaluation value for the attack method "Data Theft 2" in the asset-based risk analysis results is "5", and there is no risk evaluation value therefor in the business impact-based risk analysis results. Further, the user can find that the risk evaluation value for the attack method "Data Tampering 1" in the asset-based risk analysis results is "4", and the risk evaluation value therefor in the business impact-based risk analysis results is "5". When the results of two risk analyses are displayed side by side as described above, it is possible not only to determine whether or not they were also evaluated in the business impact-based risk analyses but also to compare the results of both risk analyses.

Note that, in the display (i.e., the table) shown in FIG. 8, the analysis result display unit 103 may change the display color or the like of the risk evaluation values included in the asset-based risk analysis results depending on whether or not there are risk evaluation values for the corresponding combinations in the business impact-based risk analysis results as in the case of the example shown in FIG. 6. Further, the analysis result display unit 103 may change, for combinations of which there are risk evaluation values in both the asset-based risk analysis results and the business impact-based risk analysis results, the display color or the like of the risk evaluation values or the like according to the risk evaluation values. Further, in the example shown in FIG. 6, the analysis result display unit 103 may add a column for displaying a business impact-based risk analysis result for each asset, and display the business impact-based risk analysis results in the added column.

Figure 9:
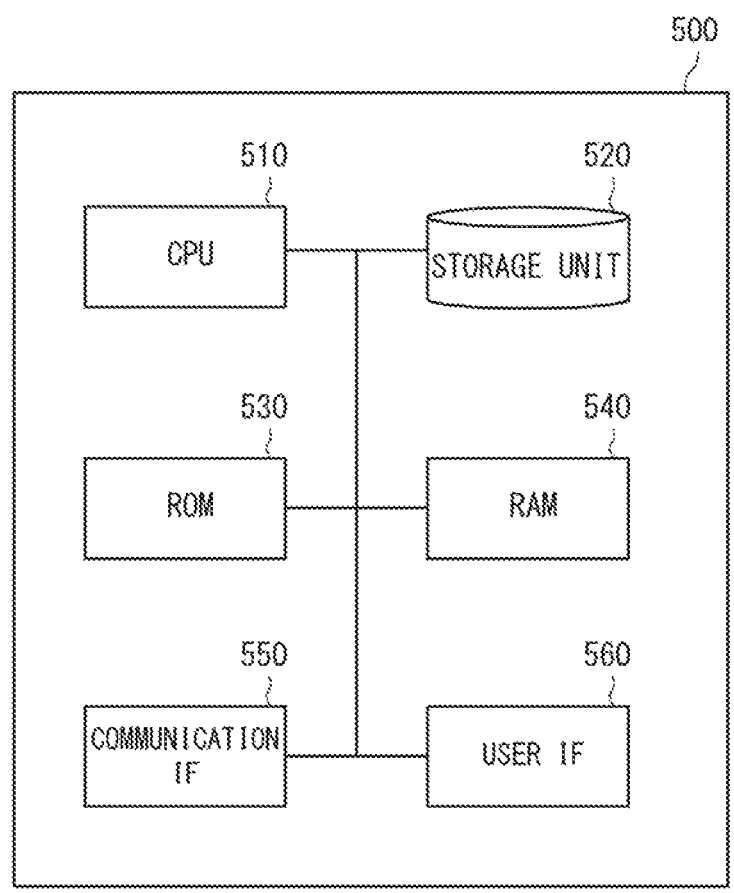
FIG. 9 is a block diagram showing an example of a configuration of a computer apparatus.

Next, a physical configuration of a risk analysis result display apparatus is described. FIG. 9 shows an example of a configuration of a computer apparatus that may be used as the risk analysis result display apparatus 100. A computer apparatus 500 includes a control unit (CPU: Central Processing Unit) 510, a storage unit 520, a ROM (Read Only Memory) 530, a RAM (Random Access Memory) 540, a communication interface (IF) 550, and a user interface 560.

The communication interface 550 is an interface for connecting the computer apparatus 500 to a communication network through wired communication means or wireless communication means or the like. The user interface 560 includes, for example, a display unit such as a display device. Further, the user interface 560 includes an input unit such as a keyboard, a mouse, and a touch panel.

The storage unit 520 is an auxiliary storage device that can hold various types of data. The storage unit 520 does not necessarily have to be a part of the computer apparatus 500, but may be an external storage device, or a cloud storage connected to the computer apparatus 500 through a network. The storage unit 520 can be used as, for example, at least one of the asset-based risk analysis result DB 111, the business impact-based risk analysis result DB 112, or the comparison result DB 113 shown in FIG. 2.

The ROM 530 is a non-volatile storage device. For example, a semiconductor storage device such as a flash memory having a relatively small capacity can be used for the ROM 530. A program(s) that is executed by the CPU 510 may be stored in the storage unit 520 or the ROM 530. The storage unit 520 or the ROM 530 stores, for example, various programs for implementing the function of each unit in the risk analysis result display apparatus 100.

The aforementioned program can be stored and provided to the computer apparatus 500 by using any type of non-transitory computer readable media. Non-transitory computer readable media include any type of tangible storage media. Examples of non-transitory computer readable media include magnetic storage media such as floppy disks, magnetic tapes, and hard disk drives, optical magnetic storage media such as magneto-optical disks, optical disk media such as CD (Compact Disc) and DVD (Digital Versatile Disk), and semiconductor memories such as mask ROM, PROM (Programmable ROM), EPROM (Erasable PROM), flash ROM, and RAM. Further, the program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers or a radio communication line.

The RAM 540 is a volatile storage device. As the RAM 540, various types of semiconductor memory apparatuses such as a DRAM (Dynamic Random Access Memory) or an SRAM (Static Random Access Memory) can be used. The RAM 540 can be used as an internal buffer for temporarily storing data and the like. The CPU 510 expands (i.e., loads) a program stored in the storage unit 520 or the ROM 530 in the RAM 540, and executes the expanded (i.e., loaded) program. The function of each unit in the risk analysis result display apparatus 100 can be implemented by having the CPU 510 execute a program. The CPU 510 may include an internal buffer in which data and the like can be temporarily stored.

Although example embodiments according to the present disclosure have been described above-described in detail, the present disclosure is not limited to the above-described-described example embodiments, and the present disclosure also includes those that are obtained by making changes or modifications to the above-described-described example embodiments without departing from the spirit of the present disclosure.

For example, the whole or part of the example embodiments disclosed above-described can be described as, but not limited to, the following Supplementary notes.

Supplementary Note 1

A risk analysis result display apparatus comprising:
comparison means for comparing a first risk analysis result including a first risk evaluation value with a second risk analysis result including a second risk evaluation value, the first risk evaluation value being a value that is obtained by evaluating a risk that arises when an attack is made on an asset in a system to be analyzed by at least one conceivable attack method, and the second risk evaluation value being a value that is obtained by evaluating a risk that arises, when an attack is made on the system along an attack path including at least one attack step including an attack source, an attack destination, and an attack method, by the attack step, the attack path being a path from an entry point included in the system to an attack target; and
display means for displaying the first risk evaluation value based on a result of the comparison, the display means being configured to display first risk evaluation values in such a manner that a first risk evaluation value for a pair of an asset and an attack method for which there is a second risk evaluation value, in the second risk analysis result, for an attack step of which the attack destination coincides with the asset included in the first risk analysis result and the attack method coincides with the attack method included in the first risk analysis result can be distinguished from a first risk evaluation value for a pair of an asset and an attack method for which there is no second risk evaluation value, in the second risk analysis result, for the attack step of which the attack destination coincides with the asset included in the first risk analysis result and the attack method coincides with the attack method included in the first risk analysis result.

Supplementary Note 2

The risk analysis result display apparatus described in Supplementary note 1, wherein the comparison means stores, in comparison result information, a pair of an asset and an attack method that is evaluated in the first risk analysis result, and information indicating whether or not there is a second risk evaluation value for an attack step including this pair of the asset and the attack method as the attack destination and the attack method while associating the pair of the asset and the attack method with the information.

Supplementary Note 3

The risk analysis result display apparatus described in Supplementary note 2, wherein the comparison means further stores, in the comparison result information, the first risk evaluation value and the second risk evaluation value for an attack step including the pair of the asset and the attack method as the attack destination and the attack method while associating the first and second risk evaluation values with the pair of the asset and the attack method.

Supplementary Note 4

The risk analysis result display apparatus described in Supplementary note 3, wherein when there are a plurality of second risk evaluation values for an attack step including the pair of the asset and the attack method as the attack destination and the attack method, the comparison means stores a representative value of the plurality of second risk evaluation values in the comparison result information.

Supplementary Note 5

The risk analysis result display apparatus described in any one of Supplementary notes 2 to 4, wherein the display means refers to the comparison result information and thereby displays the first risk evaluation values in such a manner that a first risk evaluation value for a pair of an asset and an attack method for which information indicating presence of the second risk evaluation value is stored can be distinguished from a first risk evaluation value for a pair of an asset and an attack method for which information indicating absence of the second risk evaluation value is stored.

Supplementary Note 6

The risk analysis result display apparatus described in any one of Supplementary notes 1 to 5, wherein the comparison means searches the second risk analysis result by using the pair of the asset and the attack method as a key, and examines whether or not there is an attack step including the pair of the asset and the attack method as the attack destination and the attack method.

Supplementary Note 7

The risk analysis result display apparatus described in Supplementary note 6, wherein
when there is an attack step including the pair of the asset and the attack method as the attack destination and the attack method, the comparison means stores information indicating presence of the second risk evaluation value in the information indicating whether or not there is the second risk evaluation value, and
when there is no attack step including the pair of the asset and the attack method as the attack destination and the attack method, the comparison means stores information indicating absence of the second risk evaluation value in the information indicating whether or not there is the second risk evaluation value.

Supplementary Note 8

The risk analysis result display apparatus described in any one of Supplementary notes 1 to 7, wherein the display means displays a first risk evaluation value for a pair of an asset and an attack method for which there is a second risk evaluation value, in the second risk analysis result, for an attack step of which the attack destination coincides with an asset included in the first risk analysis result and the attack method coincides with an attack method included in the first risk analysis result, and a first risk evaluation value for a pair of an asset and an attack method for which there is no second risk evaluation value, in the second risk analysis result, for an attack step of which the attack destination coincides with an asset included in the first risk analysis result and the attack method coincides with an attack method included in the first risk analysis result in colors different from each other and/or in background colors different from each other.

Supplementary Note 9

The risk analysis result display apparatus described in any one of Supplementary notes 1 to 8, wherein
the display means displays, for a pair of an asset and an attack method for which there is a second risk evaluation value for an attack step of which the attack destination coincides with an asset included in the first risk analysis result and the attack method coincides with an attack method included in the first risk analysis result, the first and second risk evaluation values in such manner that they can be compared with each other, and
the display means displays, for a pair of an asset and an attack method for which there is no second risk evaluation value for an attack step of which the attack destination coincides with an asset included in the first risk analysis result and the attack method coincides with an attack method included in the first risk analysis result, the first risk evaluation value.

Supplementary Note 10

A risk analysis result display method comprising:
comparing a first risk analysis result including a first risk evaluation value with a second risk analysis result including a second risk evaluation value, the first risk evaluation value being a value that is obtained by evaluating a risk that arises when an attack is made on an asset in a system to be analyzed by at least one conceivable attack method, and the second risk evaluation value being a value that is obtained by evaluating a risk that arises, when an attack is made on the system along an attack path including at least one attack step including an attack source, an attack destination, and an attack method, by the attack step, the attack path being a path from an entry point included in the system to an attack target; and
displaying first risk evaluation values based on a result of the comparison in such a manner that a first risk evaluation value for a pair of an asset and an attack method for which there is a second risk evaluation value, in the second risk analysis result, for an attack step of which the attack destination coincides with the asset included in the first risk analysis result and the attack method coincides with the attack method included in the first risk analysis result can be distinguished from a first risk evaluation value for a pair of an asset and an attack method for which there is no second risk evaluation value, in the second risk analysis result, for the attack step of which the attack destination coincides with the asset included in the first risk analysis result and the attack method coincides with the attack method included in the first risk analysis result.

Supplementary Note 11

A non-transitory computer readable medium storing a program for causing a computer to perform processes comprising:
comparing a first risk analysis result including a first risk evaluation value with a second risk analysis result including a second risk evaluation value, the first risk evaluation value being a value that is obtained by evaluating a risk that arises when an attack is made on an asset in a system to be analyzed by at least one conceivable attack method, and the second risk evaluation value being a value that is obtained by evaluating a risk that arises, when an attack is made on the system along an attack path including at least one attack step including an attack source, an attack destination, and an attack method, by the attack step, the attack path being a path from an entry point included in the system to an attack target; and
displaying first risk evaluation values based on a result of the comparison in such a manner that a first risk evaluation value for a pair of an asset and an attack method for which there is a second risk evaluation value, in the second risk analysis result, for an attack step of which the attack destination coincides with the asset included in the first risk analysis result and the attack method coincides with the attack method included in the first risk analysis result can be distinguished from a first risk evaluation value for a pair of an asset and an attack method for which there is no second risk evaluation value, in the second risk analysis result, for the attack step of which the attack destination coincides with the asset included in the first risk analysis result and the attack method coincides with the attack method included in the first risk analysis result.

REFERENCE SIGNS LIST

10 RISK ANALYSIS RESULT DISPLAY APPARATUS
11 COMPARISON MEANS

12 DISPLAY MEANS
21 FIRST RISK ANALYSIS RESULT
22 SECOND RISK ANALYSIS RESULT
100 RISK ANALYSIS RESULT DISPLAY APPARATUS
101 ANALYSIS RESULT COLLECTION UNIT
102 ANALYSIS RESULT COMPARISON UNIT
103 ANALYSIS RESULT DISPLAY UNIT
111 ASSET-BASED RISK ANALYSIS RESULT DB
112 BUSINESS IMPACT-BASED RISK ANALYSIS RESULT DB
113 COMPARISON RESULT DB

What is claimed is:

1. A risk analysis result display apparatus comprising:
at least one memory storing instructions, and
at least one processor configured to execute the instructions to:
compare a first risk analysis result including a first risk evaluation value with a second risk analysis result including a second risk evaluation value, the first risk evaluation value being a value that is obtained by evaluating a risk that arises when an attack is made on an asset in a system to be analyzed by at least one conceivable attack method, and the second risk evaluation value being a value that is obtained by evaluating a risk that arises, when an attack is made on the system along an attack path including at least one attack step including an attack source, an attack destination, and an attack method, by the attack step, the attack path being a path from an entry point included in the system to an attack target; and
display first risk evaluation values, based on a result of the comparison, in such a manner that a first risk evaluation value for a pair of an asset and an attack method for which there is a second risk evaluation value, in the second risk analysis result, for an attack step of which the attack destination coincides with the asset included in the first risk analysis result and the attack method coincides with the attack method included in the first risk analysis result can be distinguished from a first risk evaluation value for a pair of an asset and an attack method for which there is no second risk evaluation value, in the second risk analysis result, for the attack step of which the attack destination coincides with the asset included in the first risk analysis result and the attack method coincides with the attack method included in the first risk analysis result.

2. The risk analysis result display apparatus according to claim 1, wherein the at least one processor is further configured to execute the instructions to store, in comparison result information, a pair of an asset and an attack method that is evaluated in the first risk analysis result, and information indicating whether or not there is a second risk evaluation value for an attack step including this pair of the asset and the attack method as the attack destination and the attack method while associating the pair of the asset and the attack method with the information.

3. The risk analysis result display apparatus according to claim 2, wherein at least one processor is further configured to execute the instructions to store, in the comparison result information, the first risk evaluation value and the second risk evaluation value for an attack step including the pair of the asset and the attack method as the attack destination and the attack method while associating the first and second risk evaluation values with the pair of the asset and the attack method.

4. The risk analysis result display apparatus according to claim 3, wherein when there are a plurality of second risk evaluation values for an attack step including the pair of the asset and the attack method as the attack destination and the attack method, at least one processor is further configured to execute the instructions to store a representative value of the plurality of second risk evaluation values in the comparison result information.

5. The risk analysis result display apparatus according to claim 2, wherein at least one processor is further configured to execute the instructions to refer to the comparison result information and thereby display the first risk evaluation values in such a manner that a first risk evaluation value for a pair of an asset and an attack method for which information indicating presence of the second risk evaluation value is stored can be distinguished from a first risk evaluation value for a pair of an asset and an attack method for which information indicating absence of the second risk evaluation value is stored.

6. The risk analysis result display apparatus according to claim 1, wherein at least one processor is further configured to execute the instructions to search the second risk analysis result by using the pair of the asset and the attack method as a key, and examine whether or not there is an attack step including the pair of the asset and the attack method as the attack destination and the attack method.

7. The risk analysis result display apparatus according to claim 6, wherein
when there is an attack step including the pair of the asset and the attack method as the attack destination and the attack method, the at least one processor is further configured to execute the instructions to store information indicating presence of the second risk evaluation value in the information indicating whether or not there is the second risk evaluation value, and
when there is no attack step including the pair of the asset and the attack method as the attack destination and the attack method, the at least one processor is further configured to execute the instructions to store information indicating absence of the second risk evaluation value in the information indicating whether or not there is the second risk evaluation value.

8. The risk analysis result display apparatus according to claim 1, wherein the at least one processor is further configured to execute the instructions to display a first risk evaluation value for a pair of an asset and an attack method for which there is a second risk evaluation value, in the second risk analysis result, for an attack step of which the attack destination coincides with an asset included in the first risk analysis result and the attack method coincides with an attack method included in the first risk analysis result, and a first risk evaluation value for a pair of an asset and an attack method for which there is no second risk evaluation value, in the second risk analysis result, for an attack step of which the attack destination coincides with an asset included in the first risk analysis result and the attack method coincides with an attack method included in the first risk analysis result in colors different from each other and/or in background colors different from each other.

9. The risk analysis result display apparatus according to claim 1, wherein
the at least one processor is further configured to execute the instructions to display, for a pair of an asset and an attack method for which there is a second risk evaluation value for an attack step of which the attack destination coincides with an asset included in the first risk analysis result and the attack method coincides with an attack method included in the first risk analysis result, the first and second risk evaluation values in such manner that they can be compared with each other, and the at least one processor is further configured to execute the instructions to display, for a pair of an asset and an attack method for which there is no second risk evaluation value for an attack step of which the attack destination coincides with an asset included in the first risk analysis result and the attack method coincides with an attack method included in the first risk analysis result, the first risk evaluation value.

10. A risk analysis result display method performed by a computer and comprising:

comparing a first risk analysis result including a first risk evaluation value with a second risk analysis result including a second risk evaluation value, the first risk evaluation value being a value that is obtained by evaluating a risk that arises when an attack is made on an asset in a system to be analyzed by at least one conceivable attack method, and the second risk evaluation value being a value that is obtained by evaluating a risk that arises, when an attack is made on the system along an attack path including at least one attack step including an attack source, an attack destination, and an attack method, by the attack step, the attack path being a path from an entry point included in the system to an attack target; and displaying first risk evaluation values based on a result of the comparison in such a manner that a first risk evaluation value for a pair of an asset and an attack method for which there is a second risk evaluation value, in the second risk analysis result, for an attack step of which the attack destination coincides with the asset included in the first risk analysis result and the attack method coincides with the attack method included in the first risk analysis result can be distinguished from a first risk evaluation value for a pair of an asset and an attack method for which there is no second risk evaluation value, in the second risk analysis result, for the attack step of which the attack destination coincides with the asset included in the first risk analysis result and the attack method coincides with the attack method included in the first risk analysis result.

11. A non-transitory computer readable medium storing a program for causing a computer to perform processes comprising:

comparing a first risk analysis result including a first risk evaluation value with a second risk analysis result including a second risk evaluation value, the first risk evaluation value being a value that is obtained by evaluating a risk that arises when an attack is made on an asset in a system to be analyzed by at least one conceivable attack method, and the second risk evaluation value being a value that is obtained by evaluating a risk that arises, when an attack is made on the system along an attack path including at least one attack step including an attack source, an attack destination, and an attack method, by the attack step, the attack path being a path from an entry point included in the system to an attack target; and displaying first risk evaluation values based on a result of the comparison in such a manner that a first risk evaluation value for a pair of an asset and an attack method for which there is a second risk evaluation value, in the second risk analysis result, for an attack step of which the attack destination coincides with the asset included in the first risk analysis result and the attack method coincides with the attack method included in the first risk analysis result can be distinguished from a first risk evaluation value for a pair of an asset and an attack method for which there is no second risk evaluation value, in the second risk analysis result, for the attack step of which the attack destination coincides with the asset included in the first risk analysis result and the attack method coincides with the attack method included in the first risk analysis result.

* * * * *